March 31, 1970  W. S. SHORE  3,503,098
METHOD AND APPARATUS FOR FABRICATING FLEXIBLE SHEET MATERIAL
Filed Nov. 3, 1967  3 Sheets-Sheet 1

INVENTOR.
WILLIAM S. SHORE
BY
Roy Davis
ATTORNEY

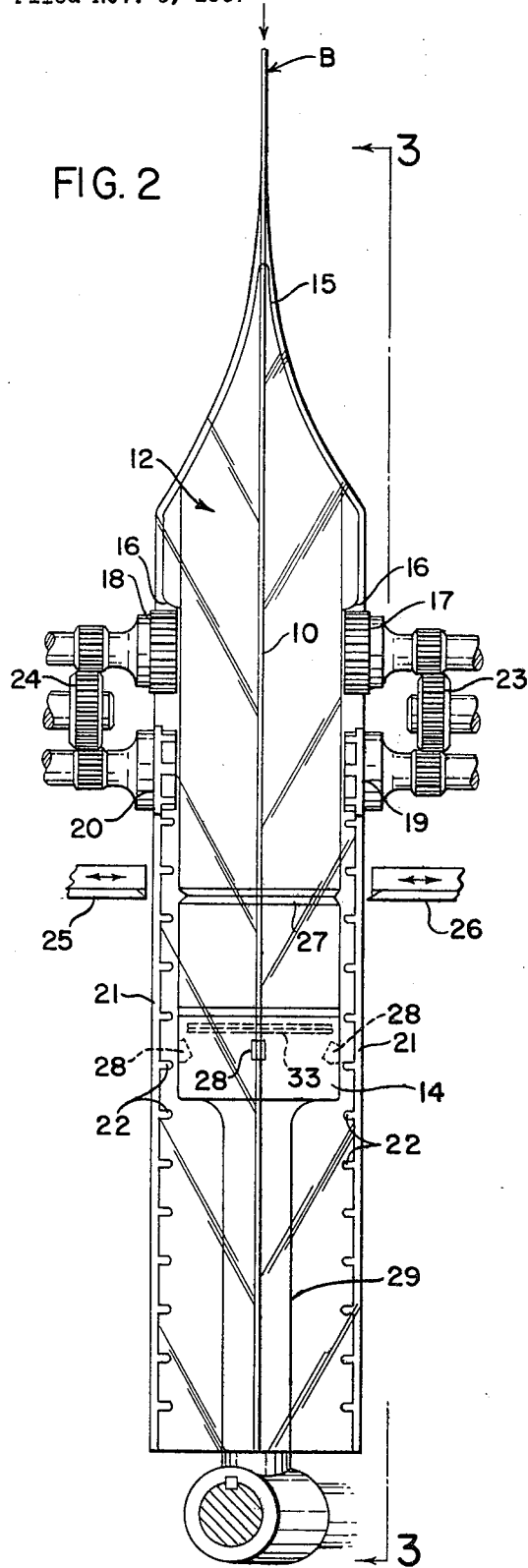
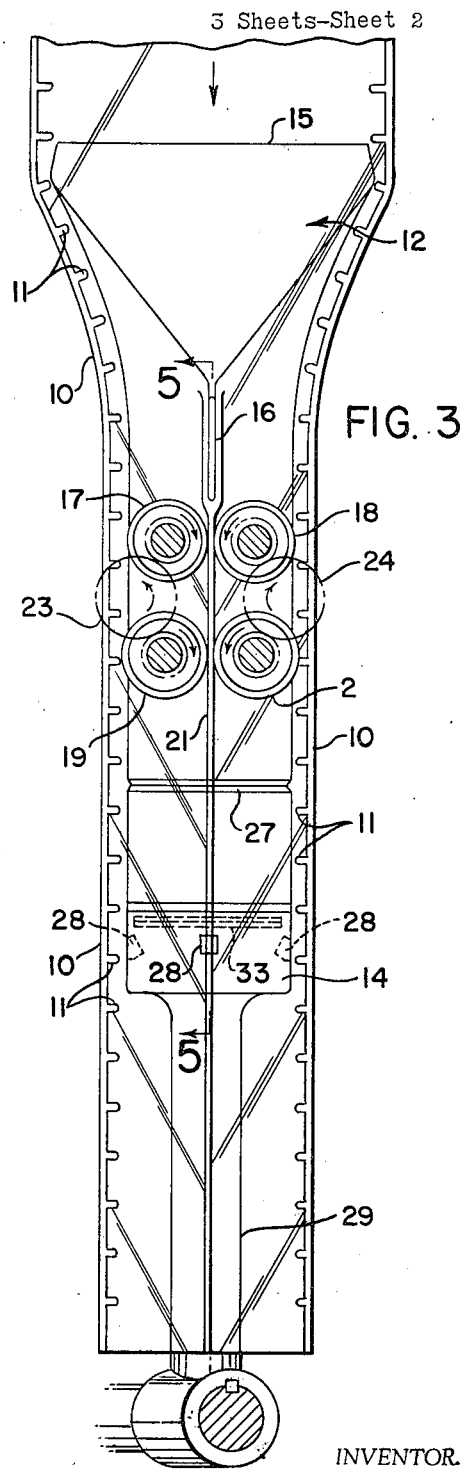

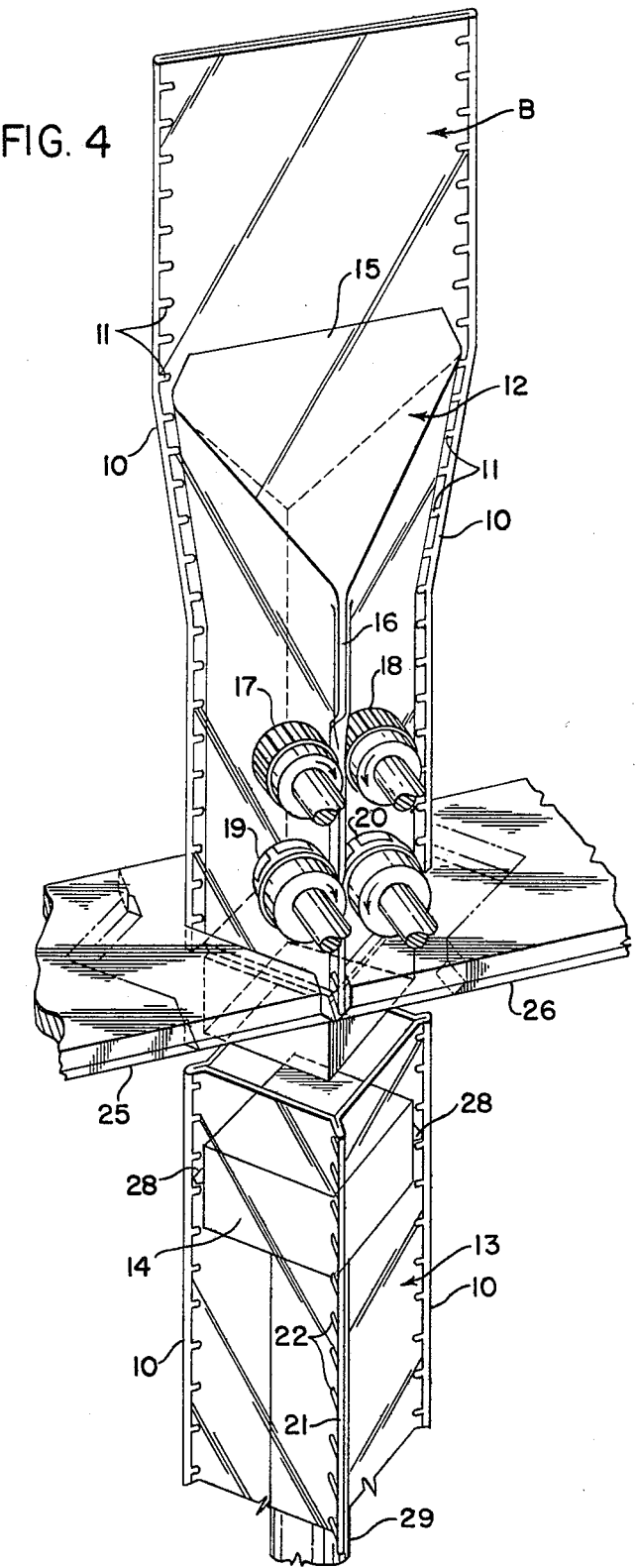
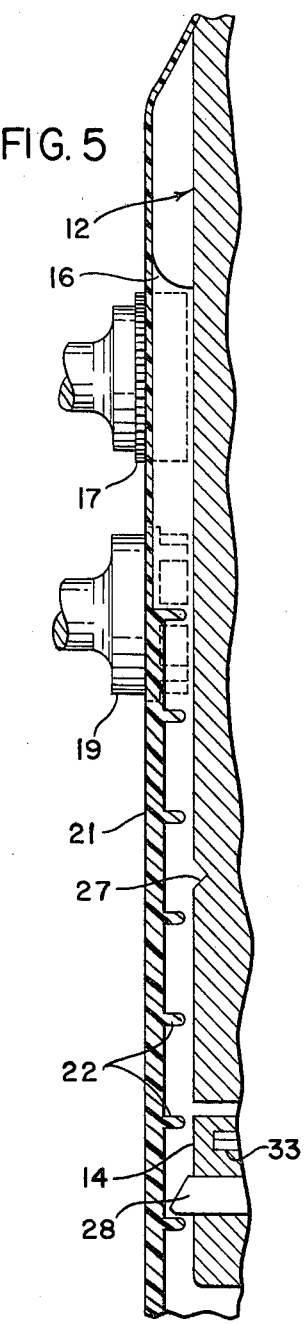

United States Patent Office 3,503,098
Patented Mar. 31, 1970

3,503,098
METHOD AND APPARATUS FOR FABRICATING FLEXIBLE SHEET MATERIAL
William S. Shore, Mayfield Heights, Ohio, assignor to Diamond Shamrock Corporation, a corporation of Delaware
Continuation-in-part of application Ser. No. 654,241, July 18, 1967, which is a continuation-in-part of application Ser. No. 567,935, July 26, 1966. This application Nov. 3, 1967, Ser. No. 680,586
Int. Cl. B29c 17/00
U.S. Cl. 18—19        11 Claims

ABSTRACT OF THE DISCLOSURE

The method and apparatus disclosed are effective to fabricate advancing flexible sheet material such as extruded tubular plastic film, to form sleeves of finite length. The apparatus utilizes a shaping mandrel to shape the material into tubular form and a reciprocating support mandrel which supports the shaping mandrel during a part of the cycle and receives from the discharge end of the shaping mandrel an end portion of the shaped material. The formed sleeve is severed from the advancing end of the mandrel cutting elements which move into supporting engagement with the shaping mandrel at the end of their cutting stroke to support the shaping mandrel while the support mandrel moves away to remove the severed sleeve.

CROSS REFERENCE TO RELATED APPLICATION

This application is a continuation-in-part of U.S. application Ser. No. 654,241 filed July 18, 1967, which is a continuation-in-part of U.S. application Ser. No. 567,935 filed July 26, 1966.

BACKGROUND OF THE INVENTION

The invention relates to the fabrication of products from flexible sheet material such as extruded plastic film and especially to the shaping and cutting of the material to form sleeves of finite length. More particularly the invention relates to the shaping and cutting of an advancing web of strip of flexible sheet material on a production basis to form sleeve or blanks which are ultimately closed at both ends to form containers such as polyhedron shaped self-supporting containers for liquids.

In my copending U.S. patent application Ser. No. 654,-241 identified above, there is described a self-supporting, upright container for packaging milk and other liquids, formed of flexible plastic film. This container is fabricated according to one embodiment, from a continuous web or strip of flexible plastic film such as the type which is extruded in tubular form and expanded or blown on an enclosed column of air. Thermoplastics are preferred such as for example polyvinylchloride, linear polyethylene, polypropylene, nylon and the like. Generally the film thickness is between 4 and 10 mils. The container has a polygonal transverse cross-section, preferably rectangular, with integral external reinforcing ribs at the intersections of the side walls to provide the desired rigidity.

In the fabrication process for the rectangular-cross-section container, a tubular length of plastic film is flattened and the marginal edge portions sealed together to form two of the reinforcing ribs. Then the flattened tubular web is expanded to the desired rectangular cross-section and external reinforcing ribs are formed at the other two intersections of the side walls. The resulting tubular product is cut to a container-length sleeve or blank and folded at its ends to form top and bottom closures.

The shaping and cutting of the tubular sleeve or blank of polygonal transverse cross-section is a difficult operation when accomplished by conventional container forming techniques and is not easily adapted to high-speed production.

The method and apparatus of the present invention however solved the fabrication problem indicated above and afford other features and advantages not obtainable from the prior art.

SUMMARY OF THE INVENTION

An object of this invention is to provide an apparatus suitable for high-speed operation which will receive and expand to polygonal cross-sectional form, an end of a flattened tubular web of plastic film, convey a predetermined end length of the expanded film beyond the point of completed expansion, cut a sleeve from the predetermined end length, remove the severed sleeve from the expanded end of the material and then repeat the cycle in sequential order at uniformly spaced time intervals.

This and other objects of the invention are accomplished by the method and apparatus embodied in the present invention.

According to a preferred embodiment of the apparatus of the invention there is provided a shaping mandrel adapted to shape advancing sheet material to a form of closed cross-section as the material passes from the entry end to the discharge end thereof. The shaping mandrel is not permanently secured to other structure but is supported during a part of the cycle by a reciprocable support mandrel which engages the shaping mandrel at the discharge end. The support mandrel is movable between a forward position in supporting engagement with the discharge end of the shaping mandrel and a rearward position spaced from the discharge end of the shaping mandrel. The apparatus includes means for advancing the sheet material over both of the mandrels at spaced-time intervals so that a measured length is advanced during each cycle. The length is severed from the formed end of the shaped material by a cutting means movable between a retracted position and a cutting position in supporting engagement with the shaping mandrel. The cutting means is effective to support the shaping mandrel during movement of the support mandrel out of its forward position. Accordingly the sleeve severed from the end of the advancing material may be removed from the shaping mandrel by the support mandrel when the support mandrel is moved to its rearward position.

According to one aspect of the invention a sealing means cooperating with the shaping mandrel is provided to form integral external reinforcing ribs at the intersections of the side walls formed by the shaping mandrel as the material is advanced thereover.

According to another aspect, the support mandrel has means for positively gripping the sleeve to facilitate its removal from the shaping mandrel after it has been severed from the advancing material.

According to still another aspect of the invention the support mandrel is provided with heating elements so that after the sleeve has been removed from the shaping mandrel, the end of the sleeve at which the cutting occurred may be folded in against the support mandrel and heat-sealed to form an end closure.

Other objects, uses and advantages will appear from the following detailed description and drawings which illustrate a preferred form of the invention.

BRIEF DESCRIPTION OF THE DRAWINGS

FIGURE 2 is a fragmentary elevational view on an scale taken on the line 2—2 of FIGURE 1;

FIGURE 3 is a fragmentary sectional view taken on the line 3—3 of FIGURE 2;

FIGURE 4 is a fragmentary perspective view on an enlarged scale showing in greater detail the apparatus of FIGURE 1; and FIGURE 5 is a fragmentary cross-sectional view on an enlarged scale taken on the line 5—5 of FIGURE 3.

DESCRIPTION OF THE PREFERRED EMBODIMENT

Figure 1:
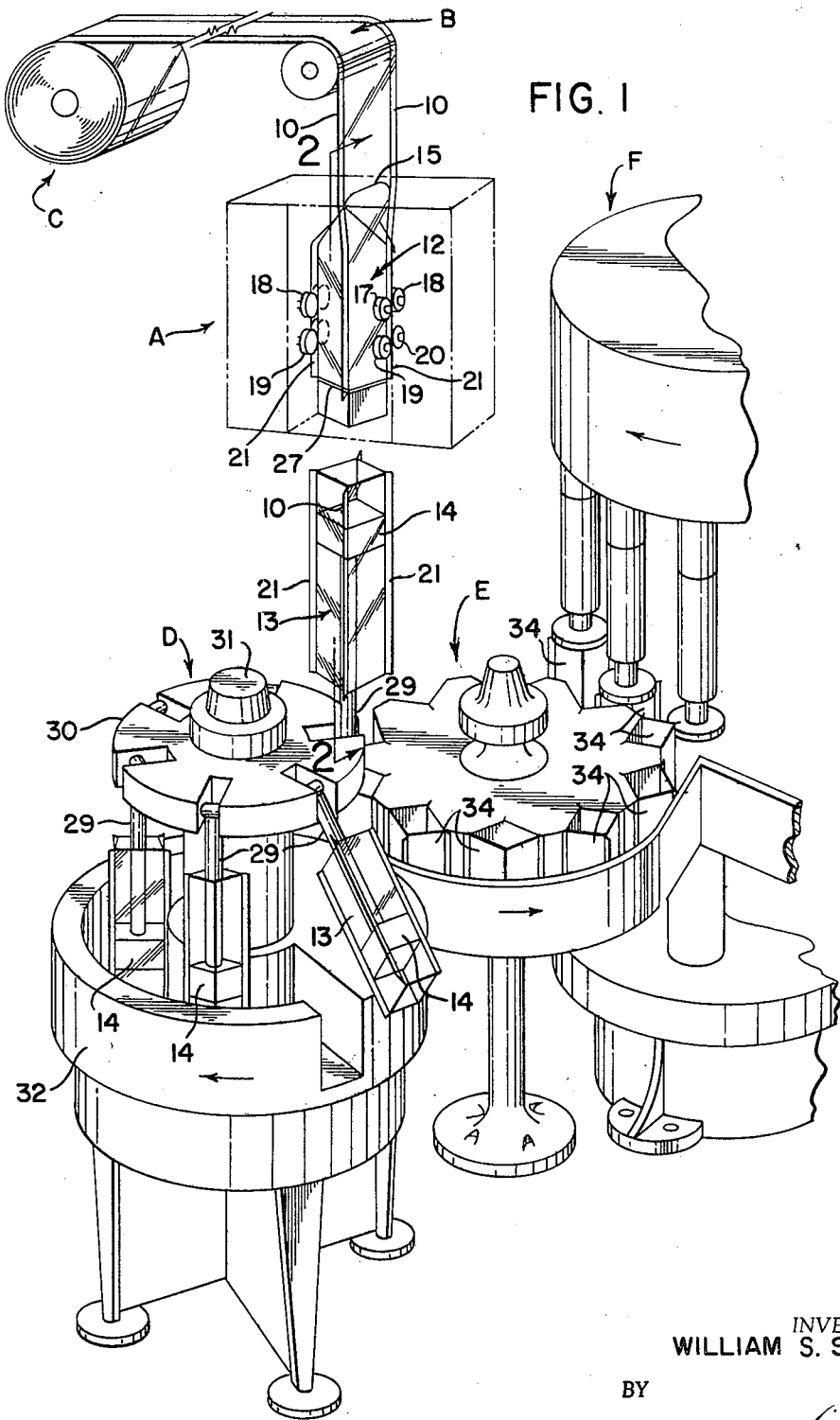
FIGURE 1 is a perspective view showing an apparatus embodying the invention used in cooperation with other container fabricating equipment.

Referring more particularly to the drawings, FIGURE 1 shows somewhat schematically plastic film fabricating equipment including a shaping and cutting unit A forming a part of the invention. The unit A is adapted to receive an end of an advancing continuous web B of extruded and flattened tubular plastic film from a roll C. The tubular plastic film may be prepared for example in the manner shown in copending U.S. patent application Ser. No. 654,241 identified above.

The cutting and shaping unit A cooperates with a support-mandrel carriage D which feeds partially fabricated container bodies to a star wheel unit E. The star wheel unit E carries the container bodies to a filling unit F which is adapted to fill them with a measured volume of liquid to be packaged. The units E and F are of generally conventional design and form no part of the invention.

The web B supplied to the shaping and cutting unit A, is of tubular form as indicated above and has integral external reinforcing ribs 10 approximately 3/16 inches wide formed therein (FIGURES 3 and 4). Also formed in the marginal edges of the web B adjacent the ribs 10 are spaced transverse reinforcing seals 11 extending perpendicular to the longitudinal dimension of the ribs 10. The end of the web B is advanced over a shaping mandrel 12 which expands the flattened web to a form of generally square cross-section. The mandrel 12 is supported from below by support mandrel 14 carried by the support mandrel carriage D. Six such support mandrels 14 are carried by the carriage D, each one adapted to be moved into supporting location beneath the shaping mandrel 12 for one operating sequence during a six position cycle.

The upper part of the mandrel 12 includes a spreader portion 15 adapted to spread the advancing web B from flattened form to a form of generally square cross-section. Located below the spreader portion 15 spaced 90° from the integral external reinforcing ribs 10 are two edge forming vanes 16 located on opposite sides of the mandrel from one another. The vanes 16 serve to form two oppositely spaced edges or corners of the expanded end of the web B.

Located below each vane 16 are a pair of opposed pull rolls 17 and 18 which squeeze together adjacent marginal edge portions of the plastic film at the corners formed by the vanes 16 and advance the expanded end of the web B across sthe mandrel 12 at uniformally spaced intervals. Located below each pair of pull rolls 17 and 18 are a pair of opposed heat sealing rolls 19 and 20 which heat seal the adjacent edge portions of the plastic film to form integral external reinforcing ribs 21 approximately 3/16 inches wide. Other heat sealing means may also be used if desired, such as a pair of opposed caterpillar type sealing belts. The heat sealing rolls 19 and 20 also form spaced transverse reinforcing seals 22 extending perpendicular to the longitudinal dimension of the ribs 21. The rolls 17 and 19 located in vertical alignment with one another have gear teeth formed in the shafts thereof which are engaged by one of two drive gears 23 (FIGURE 2). The gears 23 drive the rolls 17 and 19 simultaneously at equal speeds. Likewise the rolls 18 and 20 also located in vertical alignment with one another are driven by one of two drive gears 24. The gears 23 and 24 are turned at spaced time intervals to advance a predetermined length of the expanded end of the web B across the shaping mandrel 10 and then across the support mandrel 14. The gears are stopped when the predetermined length has been advanced to the position shown in FIGURES 2 and 3 and the heat sealing rolls 19 and 20 are moved away from one another.

When the advance of the expanded end of the web B is halted, opposed cutting elements 25 and 26 are moved forward toward one another into cutting engagement with the plastic film to sever a sleeve 13 from the end of the web. The elements 25 and 26 cooperate with a perimetric groove 27 located adjacent the end of the shaping mandrel 12 to facilitate the cutting and also to enable the cutting elements 25 and 26 to support the shaping mandrel 12. This permits the support mandrel 14 to move downwardly away from the shaping mandrel while carrying the severed sleeve or blank 13. (FIGURE 4.)

In order to assure that the severed sleeve 13 will move with the support mandrel 14 off of the bottom of the shaping mandrel 12 to the position shown in FIGURE 4, the corners of the support mandrel 14 are provided with extensible lugs 28 which are moved by a cam mechanism (not shown) within the support mandrel 14 between an extended position (FIGURES 4 and 5), and a retracted position (FIGURES 2 and 3). When the lugs 28 are in their extended position they are located between adjacent seals 11 or adjacent seals 22 to assure removal of the sleeve 13 with the support mandrel 14.

The rods 29 which carry the six support mandrels 14 are each pivotally connected to a reciprocating and revolving cylinder 30 of the support mandrel carriage D. The cylinder 30 is mounted on a reciprocating hub 31 and turns 60° at uniformally spaced time intervals to carry the support mandrels 14 successively into operating positions below the shaping mandrel 12.

As indicated in FIGURE 1 each rod 29 is pivoted to its upward position when its supporting mandrel 14 is located beneath the shaping mandrel 12 and the reciprocating hub 31 raises the cylinder 30 and the upwardly extending support mandrel 14 into engagement with the bottom of the shaping mandrel 12. When the shaping and cutting operation is complete, the hub 31 moves axially downward to carry the support mandrel 14 and the severed sleeve 13 located thereon to the position shown in FIGURE 4. The cylinder 30 after turning 60° in the direction indicated pivots the rod 29 180° downward to a position within a forming table 32 wherein the support mandrel 14 may be used in cooperation with other conventional mechanism to fold the bottom end of the severed sleeve 13 being carried thereby to form a closure.

In connection with this folding and sealing operation, each support mandrel 14 is provided with integral internal heating elements 33 which may be used to provide a thermal seal for the closure. The folding and sealing steps are performed at sequential locations on the forming table 32 so that by the time a support mandrel 14 has been turned with the cylinder 30 once more to a position beneath the shaping mandrel 12 the resulting closed-end container body 34 has been removed therefrom and transferred to a star wheel unit E rotating in a direction counter to that of the cylinder 30. The start wheel unit E carries the closed end container bodies 34 to the filling unit F where a measured quantity of liquid such as milk for example is placed therein preparatory to the closing and sealing of the top thereof.

OPERATION

In the operation of the inventive apparatus of the fabricating equipment shown, the end of the tubular flattened web B of thermoplastic film from the roll C is placed over the spreader portion 15 of the shaping mandrel 12 and pulled down over the mandrel 12 with the integral external reinforcing ribs 10 located adjacent the edges of the mandrel located 90° to the pull rolls 17 and 18. The newly formed corners located at the vanes 16 are placed between the pulls 17 and 18 so as to be tightly gripped between the roll surfaces. The gears 23 and 24 are then operated to pull the expanded end of the web B down over the mandrel 12 to a desired starting location. At this point the support mandrel 14 located beneath the shaping mandrel 12 is positioned in supporting engagement with the bottom of the shaping mandrel 12 as shown in FIGURES 2 and 3 and the lugs 28 are retracted.

The sequenced operation of the equipment may now be started. As the gears 23 and 24 turn for a predetermined time interval, predetermined length of the expanded end portion of the web is moved over the shaping mandrel 12 while its newly formed corners are provided with integral external reinforcing ribs 21 and transverse seals 22 by the heat-sealing rolls 19 and 20. At the completion of the predetermined time interval the gears 23 and 24 stop and the cutting elements 25 and 26 move inwardly toward one another to sever a sleeve 13 of predetermined length from the expanded end of the web B. At the same time the lugs 28 are extended. Once the sleeve 13 is severed, the cutting elements 25 and 26 remain in supporting engagement with the shaping mandrel at the location of the perimetric groove 27 until the support mandrel 14 has removed the sleeve 13 from the bottom portion of the shaping mandrel 12 and has been moved laterally through 60° of arc by the revolving cylinder 30 and pivoted 180° downward to the forming table 32 while at the same time the next consecutive supporting mandrel 14 has been moved laterally through 60° of arc to a position beneath the shaping mandrel 12 and raised by the hub 31 into the shaping mandrel supporting position shown in FIGURES 2 and 3. The gears 23 and 24 may then be operated again for the predetermined time interval and the cycle repeated.

As each newly severed sleeve 13 is carried on a mandrel 14 through 60° rotary increments to the various stations on the forming table 32 its bottom end is folded inward, using the supporting mandrel 14 as a form, to provide an end closure. The folds are then thermo-sealed by the heat-sealing elements 33. The resulting partially formed container body 34 is removed from its mandrel 14 in response to the reciprocating movement caused by the hub 31, and transferred to the star wheel unit E before the mandrel completes its travel through the forming table 32 so that the mandrel is free to repeat the six sequential rotary movements of its operating cycle.

Although only one embodiment of the invention is illustrated and described it will be understood that variations and modifications may be made in the form and arrangement of the several parts or elements thereof without departing from the spirit of the invention. The invention therefore is not to be limited to the particular structures and mechanisms herein shown and described nor in any manner inconsistent with the extent which the progress in the art has been advanced by the invention.

What is claimed is:

1. Apparatus for shaping and cutting a sleeve of finite length from advancing flexible sheet material, comprising:
    a shaping mandrel adapted to shape said advancing material to a form of closed cross-section, said shaping mandrel having an entry end and a discharge end,
    a reciprocable support mandrel adapted for location adjacent said discharge end of said shaping mandrel and movable between a forward position in supporting engagement with said discharge end of said shaping mandrel, and a rearward position spaced from the discharge end of said shaping mandrel,
    means for advancing said sheet material over said mandrels at spaced time intervals, and
    reciprocable cutting means movable between a retracted position and a cutting position in supporting engagement with said shaping mandrel to cut a sleeve of finite length from said shaped sheet material and to support said shaping mandrel during movement of said support mandrel out of its forward position, whereby said sleeve may be removed from said shaping mandrel by said support mandrel when said support mandrel is moved to its rearward position.

2. Apparatus as defined in claim 1 wherein said means for advancing said sheet material comprises pull rolls located adjacent said shaping mandrel with their axes perpendicular to the longitudinal centerline of said shaping mandrel and adapted to grip therebetween adjacent longitudinal marginal edge, portions of said sheet material and to pull said gripped material over said shaping mandrel.

3. Apparatus as defined in claim 1 wherein said shaping mandrel has a generally polygonal transverse cross-section.

4. Apparatus as defined in claim 3 wherein said shaping mandrel has a generally quadrilateral transverse cross-section.

5. Apparatus as defined in claim 3 including heat sealing means located adjacent at least two longitudinal corners of said shaping mandrel and adapted to heat seal adjacent longitudinal edge portion of said material to form integral external reinforcing ribs at the intersections of the side walls of said shaped sheet material.

6. Apparatus as defined in claim 5 wherein said heat sealing means includes means for forming spaced transverse seals adjacent said ribs and angularly disposed relative thereto.

7. Apparatus as defined in claim 1 wherein a plurality of support mandrels are provided and said apparatus includes a revolving cylinder, said support mandrels being carried by said cylinder and said cylinder being adapted to carry said support mandrels through a multi-position cycle wherein each mandrel is sequenced into engagement with said shaping mandrel one time for each full rotation of said cylinder.

8. Apparatus as defined in claim 7 wherein said revolving cylinder is adapted for axial reciprocation whereby a severed sleeve located on a support mandrel with its severed end located on said discharge end of said shaping mandrel may be slipped off of said shaping mandrel by axial movement of said cylinder.

9. Apparatus as defined in claim 8 wherein said support mandrels are carried by said cylinder for pivotal movement through about 180° between an outward position extending toward said shaping mandrel and parallel to the axis of said cylinder, and an inward position parallel to the axis of said cylinder.

10. Apparatus as defined in claim 9 including a forming table operatively associated with said revolving cylinder, said forming table defining a plurality of forming stations and being adapted to receive said support mandrels when said mandrels are in their inward position and to cooperate with said support mandrels to form an end closure in said sleeve during sequential movement of said mandrels from one forming station to the next.

11. Apparatus as defined in claim 10 wherein each support mandrel is provided with a heating element for heat sealing said end closure.

References Cited

UNITED STATES PATENTS 3,058,150   10/1962   Makowski.
3,234,594   2/1966    Winstead.
3,244,788   4/1966    Michell et al.
3,376,181   4/1968    Larson et al.
3,400,426   9/1968    Boggs.

WILLIAM J. STEPHENSON, Primary Examiner

U.S. Cl. X.R.

18—4, 5, 20